United States Patent [19]

Walther et al.

[11] 4,008,923
[45] Feb. 22, 1977

[54] RIM, WHEEL AND FASTENING MEANS ASSEMBLY

[75] Inventors: William D. Walther, Kettering; Robert A. DeRegnaucourt, Centerville, both of Ohio

[73] Assignee: Dayton-Walther Corporation, Dayton, Ohio

[22] Filed: Sept. 2, 1975

[21] Appl. No.: 609,594

[52] U.S. Cl. .................. 301/12 R; 301/13 SM; 301/63 D
[51] Int. Cl.[2] .................................. B60B 23/10
[58] Field of Search ............ 301/10 R, 11 R, 11 S, 301/12 R, 13 R, 13 SM, 18–20, 95–98, 63 D

[56] References Cited

UNITED STATES PATENTS

| | | | |
|---|---|---|---|
| 1,230,616 | 6/1917 | Stevenson | 301/13 SM |
| 2,241,839 | 5/1941 | Woodward | 301/12 R |

FOREIGN PATENTS OR APPLICATIONS

| | | | |
|---|---|---|---|
| 670,207 | 8/1929 | France | 301/13 R |
| 530,022 | 7/1931 | Germany | 301/13 SM |
| 149,415 | 8/1920 | United Kingdom | 301/13 SM |

Primary Examiner—Drayton E. Hoffman
Assistant Examiner—Charles A. Marmor
Attorney, Agent, or Firm—Mack D. Cook, II

[57] ABSTRACT

A rim, wheel and fastening assembly. The rim has radially outwardly directed bead flanges and a radially inwardly projecting mounting flange with an axially extending portion attached to the rim between the bead flanges. The rim mounting flange has a radially inclined portion and a radially directed portion with inwardly facing surfaces. The wheel has a felloe portion with outwardly facing radially inclined and radially directed surfaces for mating engagement with the conforming rim flange surfaces. The fastening assembly includes a shank component projecting axially from a radially directed wheel felloe surface and through a radially directed rim flange portion and a rotatable component with a radially oriented surface for fastening a rim flange on a wheel felloe. The fastening assembly also includes a clamp element with radially inclined and radially directed surfaces for mating engagement with conforming rim flange surfaces. Also, for a dual tire mounting the wheel felloe portion has an axially oriented surface for sliding engagement with a clamp element.

2 Claims, 4 Drawing Figures

RIM, WHEEL AND FASTENING MEANS ASSEMBLY

BACKGROUND OF THE INVENTION

The present invention relates to a tire carrying rim, wheel and fastening means assembly. Tires may be single mounted or dual mounted using the rims, wheel and fastening means according to the invention. Dual mounting of tire carrying rims does not require use of a separating means such as an annular spacer.

Prior art patents particularly relevant to a rim, wheel and fastening means assembly according to the invention include U.S. Pat. No. 1,230,616, U.S. Pat. No. 1,880,641 and U.S. Pat. No. 3,893,688. Other prior art relating to tire carrying rims demountably carried on vehicle wheels include the patents to be found (the July, 1973, classification) in Class 301, beginning with sub-class 10R and particularly including sub-classes 13R and 13 SM.

Also relevant to the present invention is the disclosure of co-pending application U.S. Ser. No. 592,502, filed July 9, 1975.

The prior art rim, wheel and fastening means assemblies were originally designed primarily for utilitarian purposes. There were no requirements for design standards established by the vehicle manufacturer, the tire manufacturer, the vehicle operator or industry regulations. Currently, the vehicle manufacturer establishes standards for both performance characteristics and aesthetic or styling considerations. The tire manufacturers are endeavoring to provide tires which have optimum performance characteristics, including lateral and radial balance. Vehicle users and industry regulations seek longer tire life and complete safety in operation even under the most severe of vehicle operating conditions. Consequently, it is being required that this art provide improved elements, the rims, the wheels, the fastening means therefor, which satisfy requirements and design standards of recent vintage.

Fundamental in providing an improved rim, wheel and fastening means assembly is the establishment and maintenance of an accurate and relatively precise relationship between these elements. Emphasis must be placed on establishing a mounting relationship between these elements which will not create or avoid creating conditions of what are now commonly referred to as excessive lateral (axial) or radial runout or an imbalance of the tire-rim-wheel fastening means assembly.

SUMMARY OF THE INVENTION

The object of the invention is to provide an improved tire carrying rim, wheel and fastening assembly for single or dual tire mounting.

It is a further object of the invention to provide an improved rim, wheel and fastening means assembly which will establish and maintain an accurate and precise relationship between these elements both during tire mounting and subsequent vehicle operation, avoiding excessive lateral (axial) or radial runout or an imbalance of the tire-rim-wheel fastening means assembly.

These and other objects of the invention, as well as the advantages thereof, will be apparent in view of the detailed description thereof as set forth below.

In general, the rim of a rim, wheel and fastening means assembly according to the invention has radially outwardly directed flanges for seating the beads of a tire carried thereon. The rim also has a radially inwardly projecting mounting flange with an elongated axially extending portion attached thereto between the bead flanges. The rim mounting flange has a radially inclined portion and a radially directed portion each with inwardly facing rim mounting surfaces.

The wheel of a rim, wheel and fastening means assembly according to the invention has a felloe, felly or load bearing portion with outwardly facing radially inclined and radially directed surfaces for mating engagement with the conforming rim flange surfaces.

The fastening means of a rim, wheel and fastening means assembly according to the invention has a shank component projecting axially from a radially directed wheel felloe surface through a radially directed rim flange portion and a rotatable component with a radially oriented surface for fastening a rim flange on a wheel felloe.

The fastening means also includes a shank supported clamp element with radially inclined and radially directed surfaces for mating engagement with a rim flange. For a single tire mounting, the clamp surfaces are inwardly facing. For a dual tire mounting, the clamp surfaces are outwardly facing.

For a dual tire mounting, the wheel felloe has an axially oriented surface positioned radially inwardly of a radially directed surface for sliding engagement with a clamp element during fastening of dual rim flanges on a wheel felloe.

DETAILED DESCRIPTION OF THE INVENTION

Figure 1:
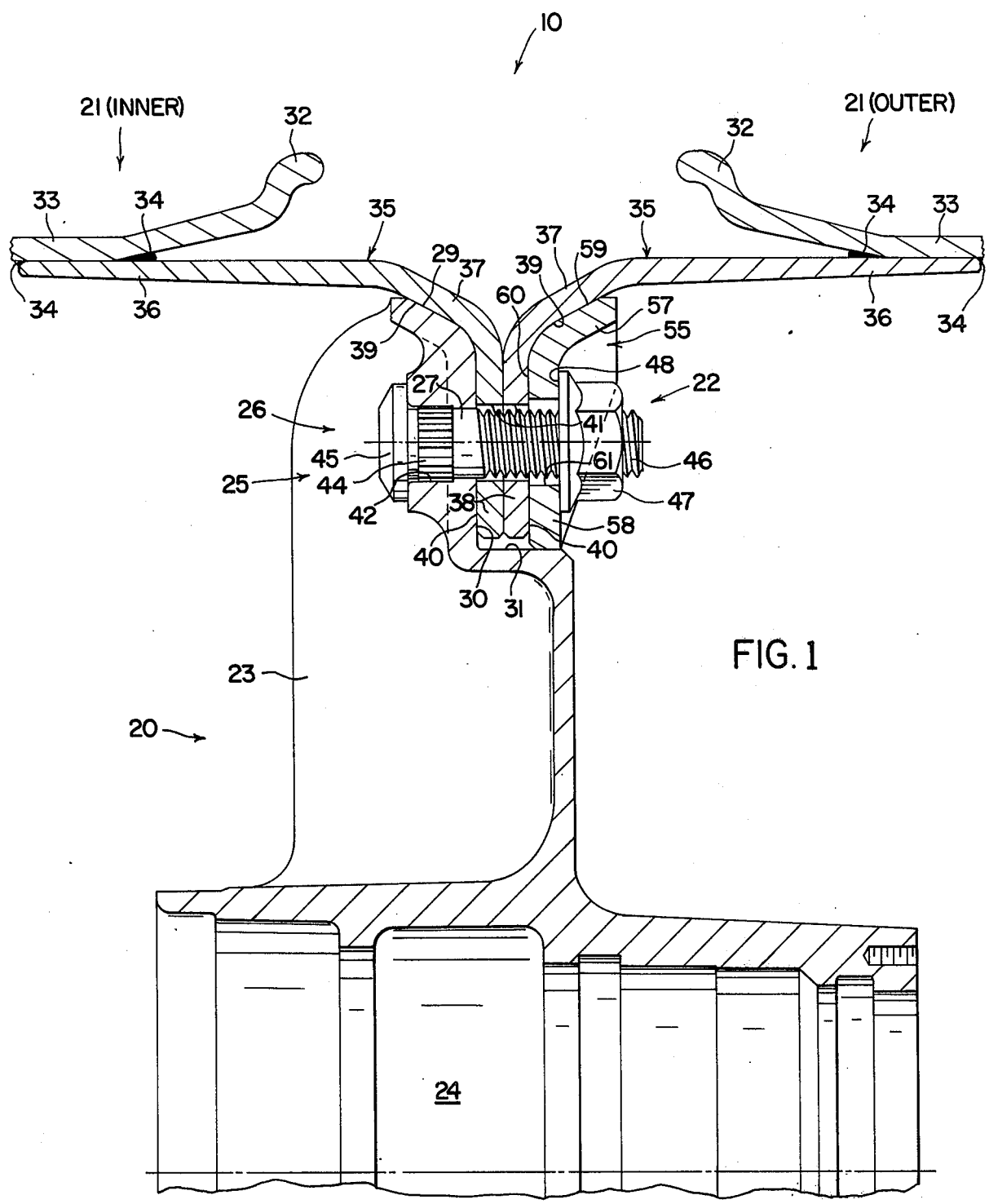
FIG. 1 is a fragmentary sectional view of a rim, wheel and fastening means assembly according to the invention, in an embodiment for dual inner and outer rim mounting.

A rim, wheel and fastening assembly according to the invention is referred to generally by the numeral 10. A wheel of the assembly 10 is indicated generally by the numeral 20. A rim of the assembly 10 is indicated generally by the numeral 21. The fastening means of an assembly 10 is indicated generally by the numeral 22.

As shown, a wheel 20 for mounting a tire carrying rim 21, either as a single or as a dual inner and outer, preferably has a plurality of spaced-apart spoke members 23 extending radially from a conventional hub area 24 adapted for attachment of the wheel to a vehicle axle (not shown).

Each spoke member terminates in a felloe, felly or load bearing portion referred to generally by the numeral 25. Each wheel felloe 25 has a predetermined mounting location indicated generally at 26 for the axially projecting component or shank 27 of a fastening means 22.

A wheel felloe 25 has a radially inclined outer surface 29 merging into or with a radially directed axially outer surface 30 having a mounting location 26 for the shank 27 of a fastening means 22. An axially oriented surface 31 is positioned radially inwardly of and intersects a radially directed surface 30.

As shown, a tire carrying rim has dual bead flanges 32 for seating the beads (not shown) of a tire in a conventional manner. The bead flanges 32 are radially outwardly directed from an annular rim base or medial portion 33. The medial portion 33 has attached thereto, as by a weld 34, a radially inwardly projecting mounting flange referred to generally by the numeral 35.

The rim flange 35 has an elongated axially extending portion 36 integrally attached at the end to the rim base 33 by a weld 34. The axial extent of the rim flange portion 36 is determined by the style, shape and size of the tire (not shown) to be mounted on a rim 21. The axially extending rim flange portion 36 is preferably formed integrally with a radially inclined portion 37 and a radially directed portion 38. The radially inclined portion 37 has an inner surface 39 merging into or with an inner surface 40 on the radially directed portion 38. The radially directed portion 38 has a bore 41 therein for receiving the axially projecting component or shank 27 of a fastening means 22.

As shown, a shouldered axial bore 42 extends through a wheel felloe 25 at a mounting location 26. The axially inner face of a wheel felloe 25 has a radially directed surface 43 extending parallel to the felly surface 30. The shank 27 of a fastening means 22 is nonrotatably positioned within the bore 42 by a serrated annular ring 44. The axially inner end of the shank 27 has a cap flange 45 for seating against the felly surface 43. The axially outer end of the shank 27 has peripheral threads 46 for mounting a rotatable nut 47. The rotatable nut 47 has a radially oriented surface 48.

Referring to FIG. 1, the fastening means 22 includes a clamp element referred to generally by the numeral 55. A clamp element 55 has a radially inclined portion 57 formed integrally with a radially directed portion 58. The radially inclined portion 57 has an outer surface 59 merging into or with an outer surface 60 on the radially directed portion 58. The radially directed portion 58 has a bore 61 therein for receiving the axially projecting component or shank 27 of a fastening means 22. The shank 27 has an axial extent such as to project through the dual rim flange bores 41 and the clamp bore 61 for mounting a rotatable nut 47. The felly surface 31 preferably has an axial extent such as to be in sliding engagement with the radially directed portion 58 of a clamp element 55.

In this embodiment, the surface 48 on the rotatable component or nut 47 of a fastening means 22 is in engagement with a clamp element portion 58 for fastening the dual rim flanges 35 on a wheel felloe 25. The clamp elements 55 are supported, guided or piloted during fastening of the dual rim flanges 35. The inner rim 21 is mounted with the inwardly facing rim flange surfaces 39 and 40 on and against the conforming outwardly facing wheel felloe surfaces 29 and 30. The opposed dual rim flange portions 38 are in mating engagement. The outer rim 21 is mounted with the rim flange surfaces 39 and 40 on and against the conforming outwardly facing clamp element surfaces 59 and 60. By using an assembly 10 as shown in FIG. 1, a precise and accurate relationship between a wheel 20, dual rims 21 and the fastening means 22 including clamp elements 55 will be established and maintained.

Figure 2:
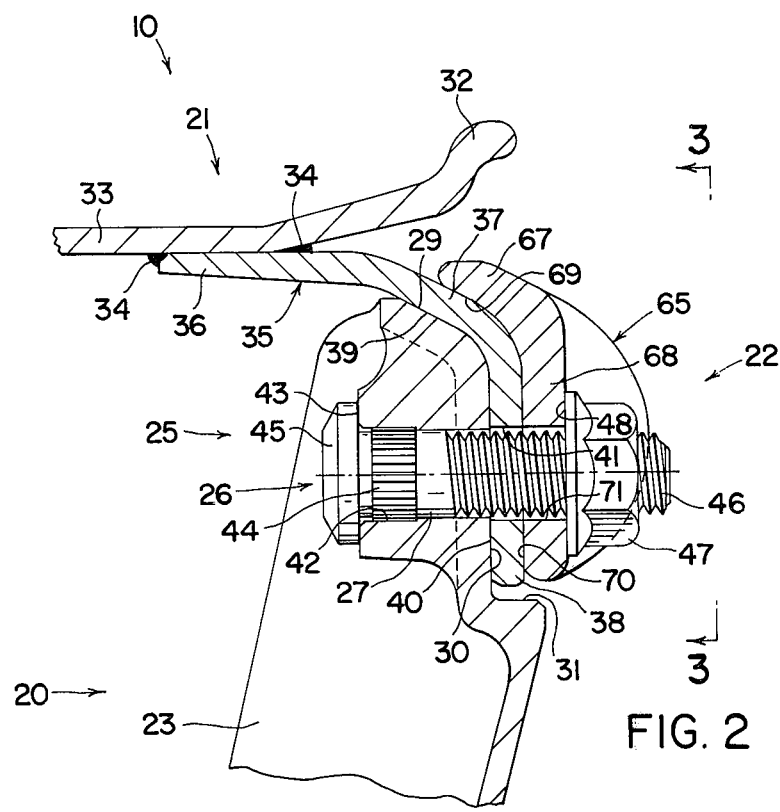
FIG. 2 is a sectional view, showing another embodiment of a fastening means for single rim mounting.
Figure 3:
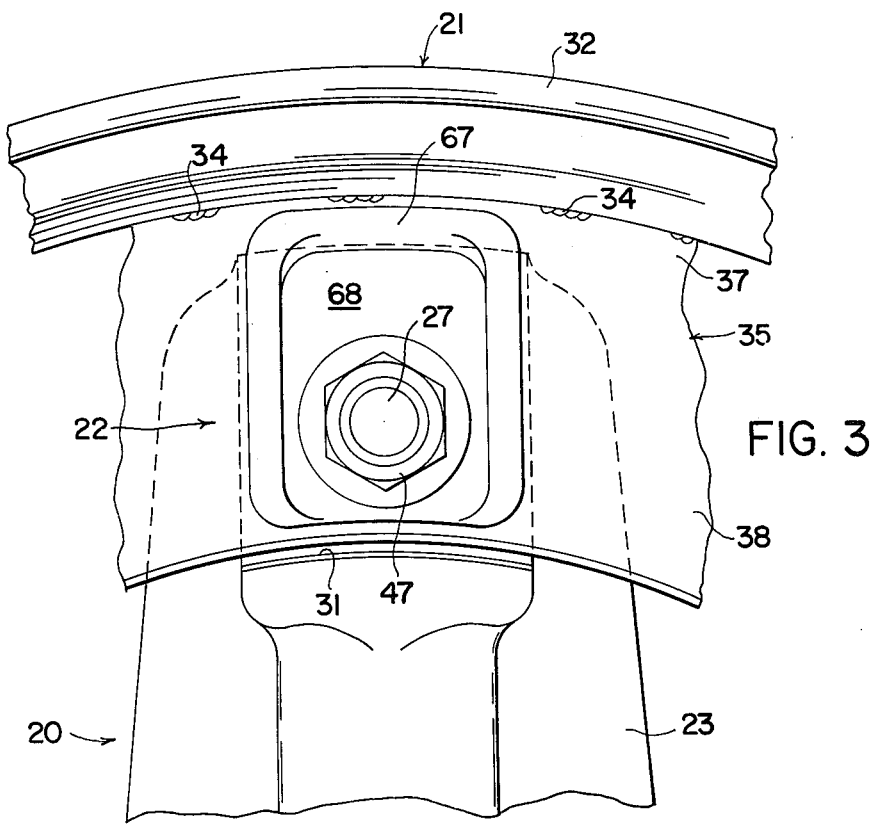
FIG. 3 is a plan view, taken substantially as indicated on line 3—3 of FIG. 2.
Figure 1:
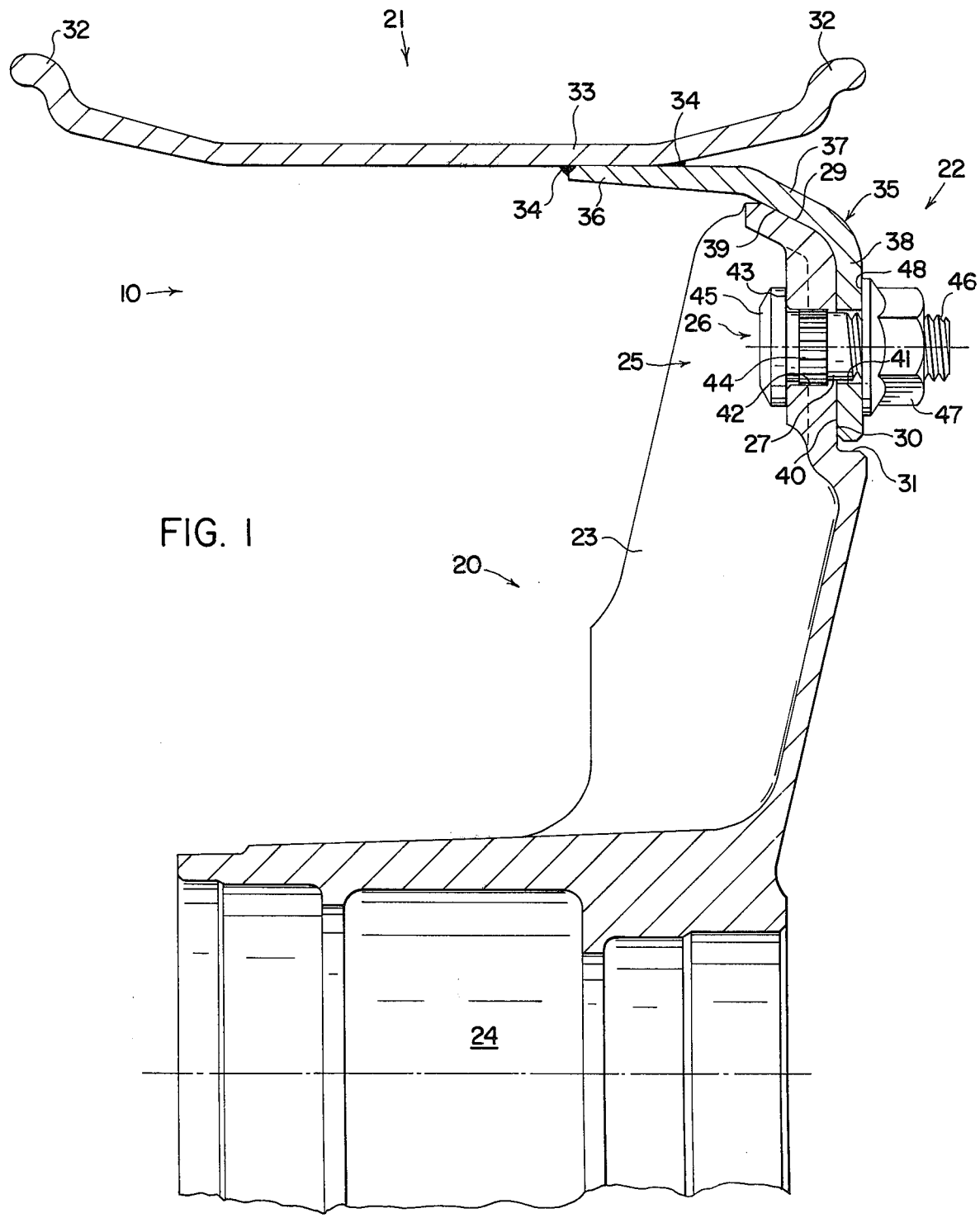

Referring to FIGS. 2 and 3, the fastening means 22 includes a clamp element referred to generally by the numeral 65. A clamp element 65 has a radially inclined portion 67 formed integrally with a radially directed portion 68. The radially inclined portion 67 has an inner surface 69 merging into or with an inner surface 70 on the radially directed portion 68. The radially directed portion 68 has a bore 71 therein for receiving the axially projecting component or shank 27 of a fastening means 22. The shank 27 has an axial extent such as to project through the single rim flange bore 41 and the clamp 71 for mounting a rotatable nut 47.

In this embodiment, the surface 48 on the rotatable component or nut 47 is in engagement with a clamp element portion 68 for fastening the rim flange 35 on a wheel felloe 25. The single rim 21 is mounted with the inwardly facing rim flange surfaces 39 and 40 on and against the outwardly facing wheel felloe surfaces 29 an 30. The inwardly facing clamp element surfaces 69 and 70 are positioned on and against the rim flange portions 37 and 38. By using an assembly 10 as shown in FIGS. 2 and 3, a precise and accurate relationship between a wheel 20, a rim 21 and the fastening means 22 including clamp elements 65 will be established and maintained.

As disclosed herein, wheel felloe surfaces 30 and 43, a rim flange surface 40, and clamp element surfaces 60 and 70, each preferably extend substantially perpendicularly to the rotational axis of the assembly 10. A wheel felloe surface 31, a rim flange portion 36, a rim flange bore 41, a wheel felloe bore 42, and clamp element bores 61 and 71, each preferably extend substantially parallel to the rotational axis of the assembly 10. The bevel angle between the merging wheel felloe surfaces 29 and 30, the rim flange surfaces 39 and 40, and the clamp element surfaces 59 and 60 and 69 and 70, and the configuration in or of the area of joinder, are not extremely critical so long as the bevel angle is in the range of from 18° to 30°.

MODIFICATIONS

To a person skilled in the art having read the above disclosure, it will be apparent that modifications could be made to the wheel 20, the rim 21 and the fastening means 22 of an assembly 10 without departing from the subject matter of the invention. Modifications as to the axial extent of the shank 27, the felly surface 31 and the flange portion 36 have been described. Other modifications described below, by way of illustration and not limitation, could follow.

The advantage of a wheel 20, having a plurality of spoke members 23, particularly a cast metal wheel, is reduced weight and lower cost. However, a wheel 20 could be made with an annular or substantially continuous felloe portion 25 having the axial bores 42 at spaced intervals. The rim flange 35 may be a series of elements, one for association with each fastening means 22, or be an annular or substantially continuous element having the bores 41 at spaced intervals. As shown, the axially projecting component of the fastening means 22 is a shank 27 having a cap flange 45. Alternatively, element 27 could be a stud threaded into a bore at a mounting location 26 carrying the rotatable nut 47. Or, a threaded stud could be attached to the felloe portions 25 as by conventional arc stud or capacitor-discharge welds. Still another modification to the fastening means 22 could be to use as the rotatable component a cap head bolt with an integral shank threaded into a bore at the mounting location 26.

What is claimed is:

1. A combination of dual inner and outer tire carrying rims seated and locked by fastening means on a vehicle wheel, said wheel having a plurality of spoke members, each of said spoke members having a felloe comprising a radially inclined outer surface merging into a radially directed axially outer surface and an axially oriented surface radially inwardly of and intersecting said radially directed axially outer surface, each said radially directed axially outer surface having a mounting location for an axially projecting shank of said fastening means, each of said rims having radially outwardly directed bead flanges and radially inwardly projecting mounting flanges, each of said mounting flanges having an elongated axially extending portion, integrally attached to a base portion of said rim between said bead flanges, and a radially inclined portion and a radially directed portion, each said radially inclined portion having an inner surface merging into an inner surface on each said radially directed portion, each said radially directed portion having a bore therein for receiving said shank of said fastening means, each said fastening means comprising said shank, peripheral threads on the axially outer end of said shank, a clamp element supported by said shank, and a rotatable nut mounted on said peripheral threads, each said clamp element having a radially inclined portion and a radially directed portion, each said radially inclined portion having an outer surface merging into an outer surface on each said radially directed portion, each said radially directed portion having a bore therein for receiving said shank of said fastening means, whereby, said rims are seated on, and thereafter locked on, said spoke members by tightening of each said rotatable nut of each said fastening means and by the mating engagement of said radially inclined and radially directed outer surfaces on each said clamp element with said radially inclined and radially directed inner surfaces on each said outer rim mounting flange, and by the mating engagement of said radially directed portion of each said clamp element with said axially oriented surface on each said spoke felloe, and by the mating engagement of opposed radially directed portions on each said mounting flange of said inner and outer rims, and by the mating engagement of said radially inclined and radially directed surfaces on each spoke felloe with said radially inclined and radially directed inner surfaces on each said inner rim mounting flange.

2. A combination of a tire carrying rim seated and locked by fastening means on a vehicle wheel, said wheel having a plurality of spoke members, each of said spoke members having a felloe comprising a radially inclined outer surface merging into a radially directed axially outer surface, each said radially directed axially outer surface having a mounting location for an axially projecting shank of said fastening means, said rim having radially outwardly directed bead flanges and radially inwardly projecting mounting flanges, each of said mounting flanges having an elongated axially extending portion, integrally attached to a base portion of said rim between said bead flanges, and a radially inclined portion and a radially directed portion, each said radially inclined portion having an inner surface merging into an inner surface on each said radially directed portion, each said radially directed portion having a bore therein for receiving said shank of said fastening means, each said fastening means comprising said shank, peripheral threads on the axially outer end of said shank, a clamp element supported by said shank, and a rotatable nut mounted on said peripheral threads, each said clamp element having a radially inclined portion and a radially directed portion, each said radially inclined portion having an inner surface merging into an inner surface on each said radially directed portion, each said radially directed portion having a bore therein for receiving said shank of said fastening means, whereby, said rim is seated on, and thereafter locked on, said spoke members by tightening of each said rotatable nut of each said fastening means and by the mating engagement of said radially inclined and radially directed inner surfaces on each said clamp element with said radially inclined and radially directed portions on each said rim mounting flange, and by the mating engagement of said radially inclined and radially directed surfaces on each said spoke felloe with said radially inclined and radially directed inner surfaces on each said rim mounting flange.

* * * * *

UNITED STATES PATENT OFFICE
CERTIFICATE OF CORRECTION

Patent No. 4,008,923     Dated February 22, 1977

Inventor(s) William D. Walther et al.

It is certified that error appears in the above-identified patent and that said Letters Patent are hereby corrected as shown below:

Cancel "Sheet 3 of 3", bearing thereon the designation of "Fig. 1"."Sheet 1 of 3" should read -- Sheet 1 of 2 --; "Sheet 2 of 3" should read -- Sheet 2 of 2 --. On the cover sheet "2 Claims, 4 Drawing Figures" should read -- 2 Claims 3 Drawing Figures --. Column 4, line 5, after "clamp" insert -- bore --; line 11, "an" should read -- and --.

Signed and Sealed this

Third Day of May 1977

[SEAL]

Attest:

RUTH C. MASON
*Attesting Officer*

C. MARSHALL DANN
*Commissioner of Patents and Trademarks*